Dec. 9, 1969  A. W. LUSTED  3,482,465
GEARSHIFT LEVER ASSEMBLIES
Filed Jan. 10, 1968  2 Sheets-Sheet 1
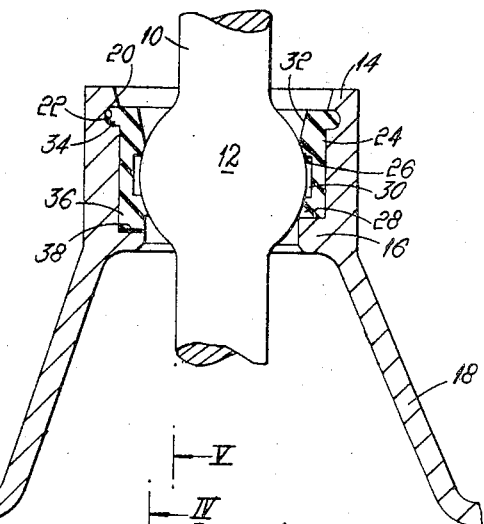
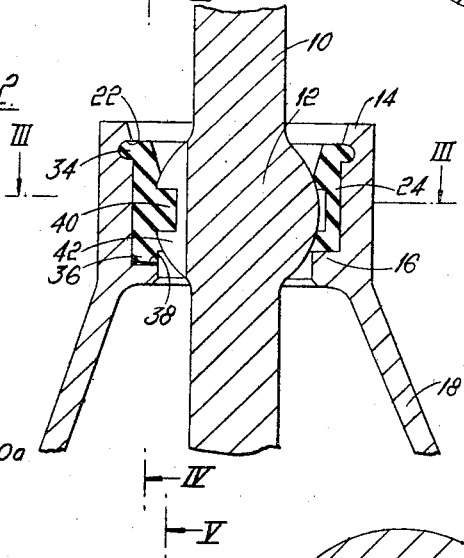
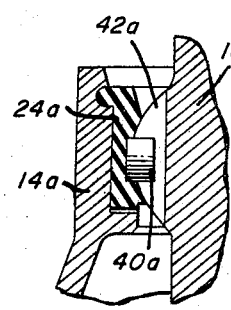
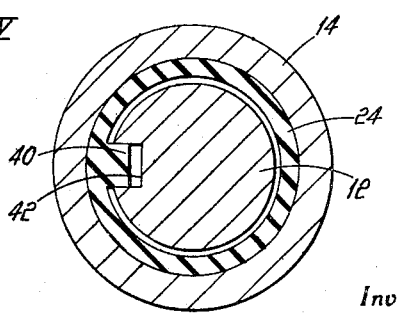
Inventor
Arthur Wyndham Lusted
BY
Charles R. White
Attorney Inventor
Arthur Wyndham Lusted
BY
Charles R. White
Attorney

United States Patent Office 3,482,465
Patented Dec. 9, 1969

3,482,465
GEARSHIFT LEVER ASSEMBLIES
Arthur Wyndham Lusted, Luton, England, assignor to General Motors Corporation, Detroit, Mich., a corporation of Delaware
Filed Jan. 10, 1968, Ser. No. 696,860
Claims priority, application Great Britain, Jan. 26, 1967, 3,884/67
Int. Cl. G05g 13/02
U.S. Cl. 74—473        7 Claims

ABSTRACT OF THE DISCLOSURE

A gearshift lever assembly, for example for a motor vehicle, includes a simple and easily assembled pivotal mounting for a gearshift lever. Specifically, interposed between a housing and a pivot ball formed intermediate the ends of the gearshift lever, there is an annular socket of elastomeric material which is a snap-on fit on the pivot ball and is maintained in slight axial compression by engagement of an external flange at one end portion of the socket with a retainer groove in the housing, and abutment of the other axial end portion of the socket against an internal flange in the housing. Also, an axial projection of the annular socket engages a slot in the internal flange of the housing, to prevent relative rotary movement between the socket and housing.

---

This invention relates to gearshift lever assemblies, for example for use in motor vehicles.

The invention is primarily concerned with a simple and easily assembled pivotal mounting for a gearshift lever.

According to the invention, a gearshift lever assembly comprises a gearshift lever formed with a pivot ball intermediate its ends, an internally flanged housing constructed as a mounting for the pivot ball, an annular socket of elastomeric material which is a snap-on fit on the pivot ball and is fitted in the housing with an external flange at one axial end portion of the socket disposed in a retainer groove in the housing and the other axial end portion of the socket held seated against the internal flange of the housing with slight pressure, and, at the other axial end portion of the socket, an axial projection which engages a slot in the internal flange of the housing to prevent relative rotary movement between the circular-section external surface of the socket and the correspondingly shaped surface of the housing.

For maintaining the socket seated with the said slight pressure against the internal flange of the housing, the relative dimensions may be such that, in at least the axial direction, the socket is an interference fit in the housing.

In addition to the external flange, the socket may have one or more lateral projections which are axially spaced from the external flange and fit into respective retainer recesses in the housing.

The elastomeric material of which the annular socket is made should be selected having regard to the prospective conditions of use. The material should have good wear resistance, good chemical and physical stability in the environment to which it will be exposed in use, and good elastic memory. A polyurethane plastics material meets these requirements very well.

The socket conveniently has a part-spherical internal surface, which, to ensure the snap-on fit, will generally have a slightly lesser diameter than the pivot ball. The internal surface of the socket may be formed with an axially spaced pair of annular lands separated by a space forming a lubricant reservoir.

The external flange of the socket may for example have a semi-circular or a rectangular cross-section alternatively, the external flange may have a V-shaped cross-section, comprising an obliquely extending leading edge to facilitate entry into the housing and a radially extending trailing edge to retain the socket securely in the housing.

The housing may have a chamfered entry aperture, to facilitate entry of the socket, especially its external flange, into the housing.

For applications in which it is desired to prevent relative rotary movement between the ball and socket about the longitudinal axis of the gearshift lever, the socket may have an internal projection, preferably cylindrical in shape, which fits into an axially extending slot in the ball. This projection may for example be integral with the elastomeric material of the socket, or may alternatively be a cylindrical metal pin moulded in situ with the socket, or otherwise secured to the socket.

The pivot ball and the gearshift lever may both be made of metal: conveniently they are constructed integrally with one another.

The housing of the gearshift lever assembly may be of metal: it may form part of a top cover of a gearbox, for example, a turret portion of a gearbox top cover. A gearbox top cover having a turret portion is illustrated for example in United States patent specification 3,315,537, to which reference may be made for a fuller understanding of one possible environment of a gearshift lever assembly in accordance with the present invention.

In the accompanying drawings:

FIG. 1 is a fragmentary longitudinal section of one embodiment of a gearshift lever assembly according to the invention;

FIG. 2 is a fragmentary longitudinal section of another embodiment of a gearshift lever assembly according to the invention;

FIGURE 2a is a fragmentary longitudinal section illustrating a modification of the FIGURE 2 construction;

FIG. 3 is a cross-section on the line III—III of FIG. 2, in the direction of the arrows;

Figure 4:
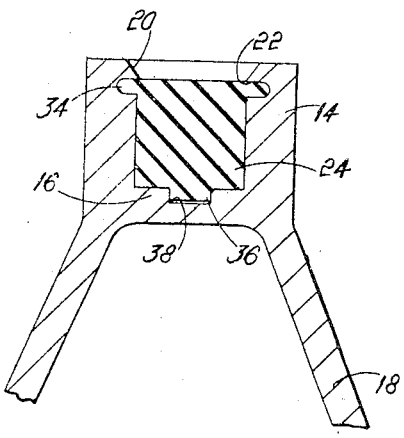
FIG. 4 is a longitudinal section on the line IV—IV of FIG. 2, in the direction of the arrows.

In the embodiment of th gearshift lever assembly according to the invention which is shown in FIG. 1, a metal gearshift lever 10 has an integrally formed pivot ball 12 intermediate its ends. The pivot ball 12 is mounted within a cup-shaped metal housing 14 which has an internal flange 16 and forms a turret portion of a top cover 18 of a motor vehicle gearbox (not shown).

The upper end portion of the cup-shaped housing 14 has a chamfered inner edge 20, axially adjacent which there is a circumferential retainer groove 22, of semi-circular cross-section, machined into the inner surface of the housing.

A one-piece annular socket 24 of polyurethane material is a snap-on fit on the pivot ball 12. The socket has a part-spherical internal surface which has a slightly lesser diameter than the pivot ball, whereby, when the socket is snap-fitted on to the ball, the elastomeric property of the polyurethane causes the socket to tend to return to is original shape, and so grip the pivot ball with a design pre-load. The part-spherical internal surface of the socket is formed with an axially spaced pair of lands 26 and 28, between which there is a space 30, forming a lubricant reservoir. Adjacent the land 26 there is a flared surface portion 32, to facilitate the fitting of the socket on the pivot ball.

The annular socket 24, when in position on the pivot ball 12, can be introduced into the cup-shaped housing 14 by way of the chamfered edge 20, which forms an entry aperture, to give a close fit of the socket in the housing. The external surface of the socket is generally cylindrical in shape, with, at one axial end portion of the socket, an external flange 34 which has a semi-circular cross-section to allow the flange to fit closely into the retainer groove 22 in the housing. The socket is an interference fit in the housing in the axial direction, such that, with the external flange fitting in the retainer groove, the other axial end portion of the socket is held seated with slight pressure against the internal flange 16 of the housing. At this other end portion of the socket there is an axial projection 36 which engages a slot 38 in the internal flange 16 of the housing to prevent relative axial rotation between the socket and housing.

Figure 5:
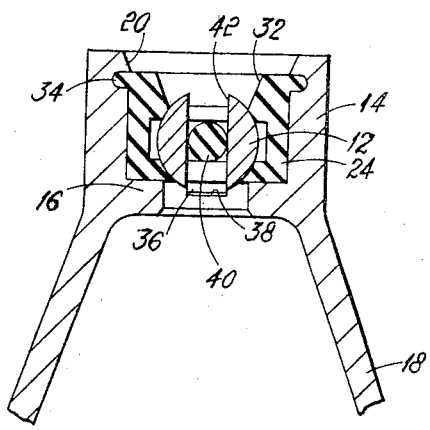
FIG. 5 is a longitudinal section on the line V—V of FIG. 2, in the direction of the arrows.

The embodiment of the gearshift lever assembly according to the invention which is shown in FIGS. 2 to 5, is for the most part similar to the embodiment shown in FIG. 1, and like parts in the two embodiments are denoted by like reference numerals. However, the embodiment shown in FIGS. 2 to 5, is intended for use with a cranked gearshift lever or for other applications in which relative rotary movement between the gearshift lever 10 and the housing 14 is to be prevented. Relative rotary movement between the socket and the housing is prevented by the axial projection 36 of the polyurethane socket 24, this projection fitting into the slot 38 in the housing flange 16 as already described; to prevent relative rotary movement between the gearshift lever and the socket, the socket also has a cylindrical integral radially extending internal projection 40 which fits into an axially extending slot 42 in the pivot ball 12. The projection 40 and slot 42, although preventing relative rotation, do not prevent the desired pivotal movements of the gearshift lever about two mutually perpendicular axes situated in the radial plane of the gearshift lever passing through the centre of the pivot ball.

FIGURE 2a shows alternate construction to the embodiments of FIGURES 2 through 5. As shown, socket 24a supported in housing 14a has an inwardly extending metallic pin 40a molded in position in the socket. This pin contacts the side walls of slot 42a formed in the ball portion of the lever 10a to prevent relative rotation of the lever relative to the socket.

As described in relation to these embodiments, the ball seat which is interposed between the pivot ball and the cup-shaped housing is made as a one-piece socket which includes an efficient ball seat retainer in the form of the external flange. This one-piece socket can be produced by a simple moulding operation, and allows easy assembly of the pivotal mounting for the gearshift lever, without the need for nuts, lock washers or other separate ball seat retainers.

I claim:

1. A gearshift lever assembly comprising: a gearshift lever; a pivot ball formed intermediate the ends of the gearshift lever; a housing constructed as a mounting for the pivot ball; an internal flange on the housing, at a position spaced from an annular retainer groove in the housing, the internal flange being formed with a slot; an external flange at one axial end portion of an annular socket of elastomeric material; an axial projection at the other axial end portion of the socket; and, interposed between the pivot ball and the housing, the annular socket having a snap-on fit on the pivot ball and fitted in the housing with the external flange at the said one axial end portion of the socket disposed in the retainer groove in the housing and the other axial end portion of the socket held seated against the internal flange of the housing with slight pressure, and the axial projection of the socket engaging the slot in the internal flange of the housing to prevent relative rotary movement between the socket and housing.

2. A gearshift lever assembly according to claim 1, wherein the annular socket has a part-spherical internal surface formed with an axially spaced pair of annular lands separated by a space forming a lubricant reservoir.

3. A gearshift lever assembly according to claim 2, wherein the socket has a cylindrical internal projection which fits into a longitudinally extending slot in the pivot ball.

4. A gearshift lever assembly according to claim 3, wherein the cylindrical internal projection of the socket comprises a metal pin moulded in situ with the socket.

5. A gearshift lever assembly according to claim 4, wherein the socket is made of polyurethane, the pivot ball and the gearshift lever are both made of metal and are constructed integrally with one another, and the housing is also made of metal and forms part of a top cover of a gearbox.

6. A gearshift lever assembly according to claim 1, wherein said socket has a projection extending radially inwardly from an inner wall thereof, said ball having a slot formed therein for receiving said projection and said slot having spaced sidewalls for contacting said projection to thereby retard rotation of said gearshift lever relative to said socket.

7. A transmission gearshifting mechanism comprising in combination a gearshift member movable to effect the selection of different ratios in a multiple ratio transmission, a housing, sleeve means of a resilient material for movably mounting said gearshift member in said housing, said housing having an opening therein for receiving said sleeve means and said gearshift member, support means for supporting said sleeve means in said housing, said support means comprising first and second spaced retaining means disposed on the inside of said housing, and said sleeve means having internal gripping portions spaced from the ends thereof for contacting said gearshift member and having spaced portions engaged by said retaining means to hold said sleeve means in compression in said housing to effect the gripping of said gearshift member by said gripping portions to thereby movably mount said gearshift member in said housing.

References Cited

UNITED STATES PATENTS 2,100,642  11/1937  Geyer _____ 74—473

MILTON KAUFMAN, Primary Examiner

U.S. Cl. X.R.

74—523